United States Patent [19]
Herrmann et al.

[11] Patent Number: 6,164,828
[45] Date of Patent: Dec. 26, 2000

[54] SUPPORT FOR A MACHINE TOOL PORTAL DRIVEN BY LINEAR MOTORS ON BOTH SIDES

[75] Inventors: Rolf Herrmann, Sohland; Harry Thonig, Neukirch; Matthias Walden, Sohland, all of Germany

[73] Assignee: Sachsische Werkzeug und Sondermaschinen GmbH, Germany

[21] Appl. No.: 09/297,248

[22] PCT Filed: Jul. 27, 1998

[86] PCT No.: PCT/DE98/02174

§ 371 Date: Jun. 15, 1999

§ 102(e) Date: Jun. 15, 1999

[87] PCT Pub. No.: WO99/11423

PCT Pub. Date: Mar. 11, 1999

[30] Foreign Application Priority Data

Sep. 22, 1997 [DE] Germany .................. 197 37 478

[51] Int. Cl.[7] ........................................ F16C 19/00
[52] U.S. Cl. .................................................. 384/57
[58] Field of Search .................... 384/54, 55, 57, 384/49, 37, 38

[56] References Cited

U.S. PATENT DOCUMENTS

| 2,378,212 | 6/1945 | Giern et al. ................... 384/57 X |
| 4,961,649 | 10/1990 | Mottate ............................ 384/49 |
| 5,249,867 | 10/1993 | Iida ................................. 384/54 X |
| 5,362,157 | 11/1994 | Ichida ............................. 384/57 X |
| 5,388,913 | 2/1995 | Cawley et al. ................. 384/38 |
| 5,540,503 | 7/1996 | Ikegame et al. ................ 384/57 |
| 5,555,789 | 9/1996 | Rosengren et al. ............ 384/57 X |
| 6,019,514 | 2/2000 | Feinstein ......................... 384/37 |

*Primary Examiner*—Lenard A. Footland
*Assistant Examiner*—Colby Hansen

[57] ABSTRACT

A mounting assembly for a machine tool carriage is driven by linear motors (4) at each end guided on fixed parallel rails running parallel to one another. At each end the bridge of the carriage has bearing plates seated on the linear motor friction plates against which it is urged by spring force. As each end of the bridge has a mounting bolt extending through the bridge and bear plate and is pivotably seated in a guide aperture in the carrier. On at least one end of the bridge, the guide bolt aperture is elongated so that the bridge can pivot about the guide bolt at the other end.

3 Claims, 2 Drawing Sheets

SUPPORT FOR A MACHINE TOOL PORTAL DRIVEN BY LINEAR MOTORS ON BOTH SIDES

BACKGROUND OF THE INVENTION

The invention is directed to a mounting assembly for a machine tool carriage driven by linear motors on both sides of the machine tool.

A machine tool of the type which uses sliding carriages guided on rails on the machine tool frame is driven on both ends by linear motors. The sliding carriages work together to perform relative motion to one another as workpiece carriers as is known in German Patent 4307482 A1. Each sliding carriage is guided on a pair of parallel spaced main rails. The linear motors are mounted on both sides of the sliding carriage and turned 90° laterally to the rails. Generally, the motors are mounted on a slide on one side and with an additional guide on the other side. Compensation of stresses and torsional forces is not provided by the slide mounting.

In German Patent 24 12 769 entitled "Column Guide for the Press Plate of a Press", it is known that a small bearing clearance can be achieved by guiding the press plate with bearing pairs on flattened surfaces on the columns so that the bearing pairs only are associated with two columns lying beside one another. Only a single bearing is associated with a further column, so that, of the six degrees of freedom of the press plate intended as a fixed body, five are guides. By this reduction of the guiding bearings from eight to five, the kinetic redundance in determination is eliminated and guidance independently of stresses and dangerous torques is achieved. However, application of the principle for the protection of linear motors running on rails from stresses or dangerous torques in a machine tool carriage as well as from accidental damage to the machine tool carriage appears to be only conditionally possible.

Therefore the object of the invention is to provide a novel mounting for a machine tool carriage driven by linear motors on both sides on fixed rails to compensate for stresses and torques on the machine tool carriage.

SUMMARY OF THE INVENTION

In accordance with the invention, this object is achieved by the features named in the first claim. Advantageous embodiments of the invention are the subject of the subclaims. The subject of the invention is a mounting assembly for a machine tool carriage driven with linear motors on both sides in the same direction. The linear motors are guided on fixed rails running parallel to one another. The linear motors carry friction contacts on which the machine carriage bridge is seated and against which it is pressed by its own weight and by spring force. The bridge is movable on the friction contacts by lateral forces which overcome the frictional force, and may be turned on the friction contacts. The bearing surfaces of the machine carriage bridge have apertures which are elongated in the longitudinal direction of the machine carriage bridge. For guiding the machine carriage bridge, the bearing surface at one end of the bridge has a bolt in a guide, while the other bearing surface has an elongated aperture. The spring force can be adjusted by special adjusting screws which are seated in the friction contact and surrounded by an open space in the bearing surfaces of the machine carriage bridge, and compression springs are disposed between the head of the adjusting screws and the bearing surfaces of the machine carriage bridge.

In the case of stresses in the machine carriage bridge or in the case of deviations of the rails from a parallel course, the lateral forces created in this case can be compensated by motion of the bearing surfaces of the carriage relative to the friction contacts guided by the elongated aperture. Accidents, in particular as a result of uneven starting of the motors, or even starting of the linear motors in opposite directions, are avoided by movement of the bearing surfaces on the friction contacts around the bolts. The operating position of the machine carriage bridge can be reached again after an accident by controlling a linear motor.

DETAILED DESCRIPTION OF THE PREFERRED EMBODIMENT

Figure 1:
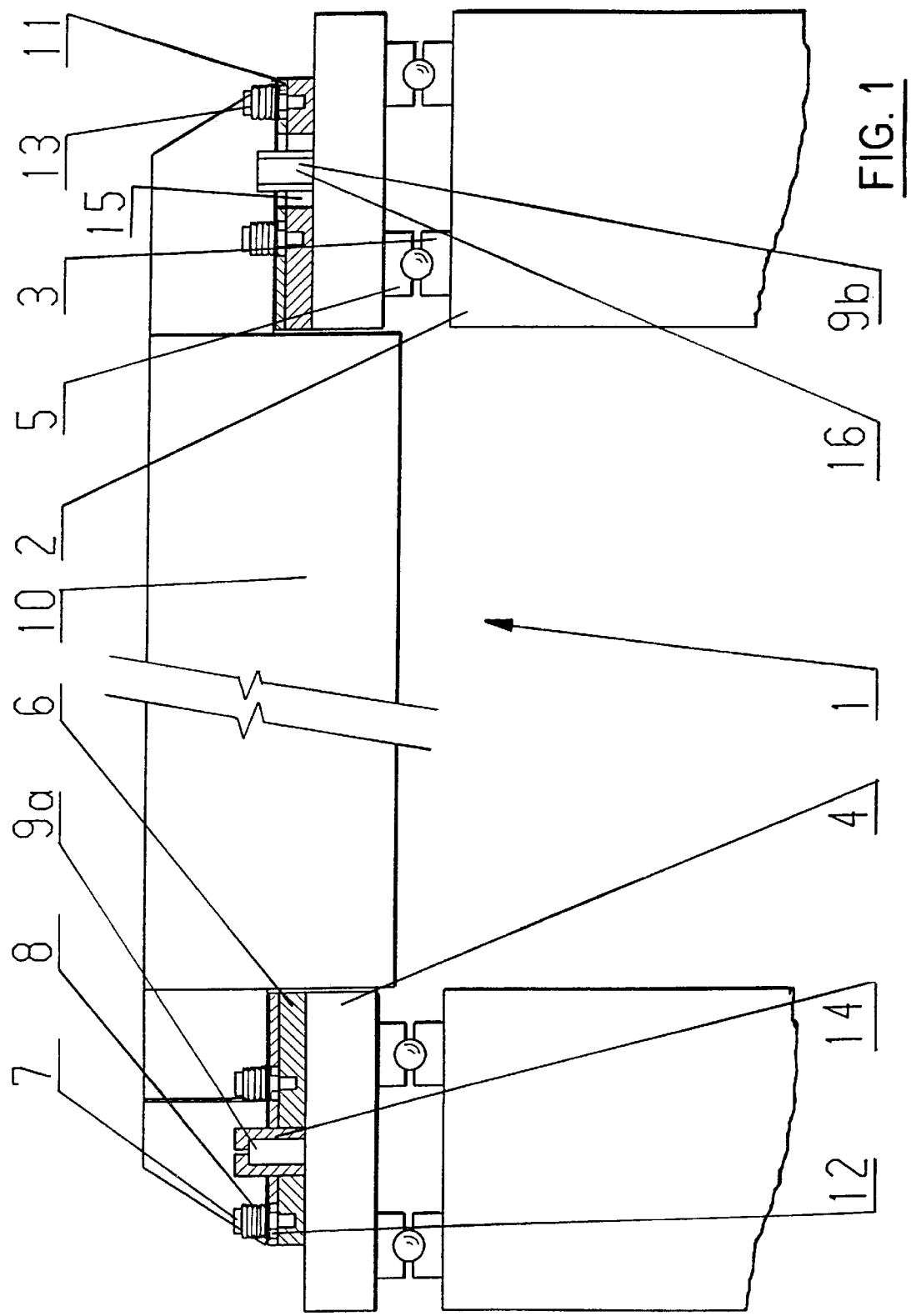
FIG. 1 is a fragmentary end elevational view in partial section of a machine tool with a carriage assembly embodying the present invention.
Figure 2:
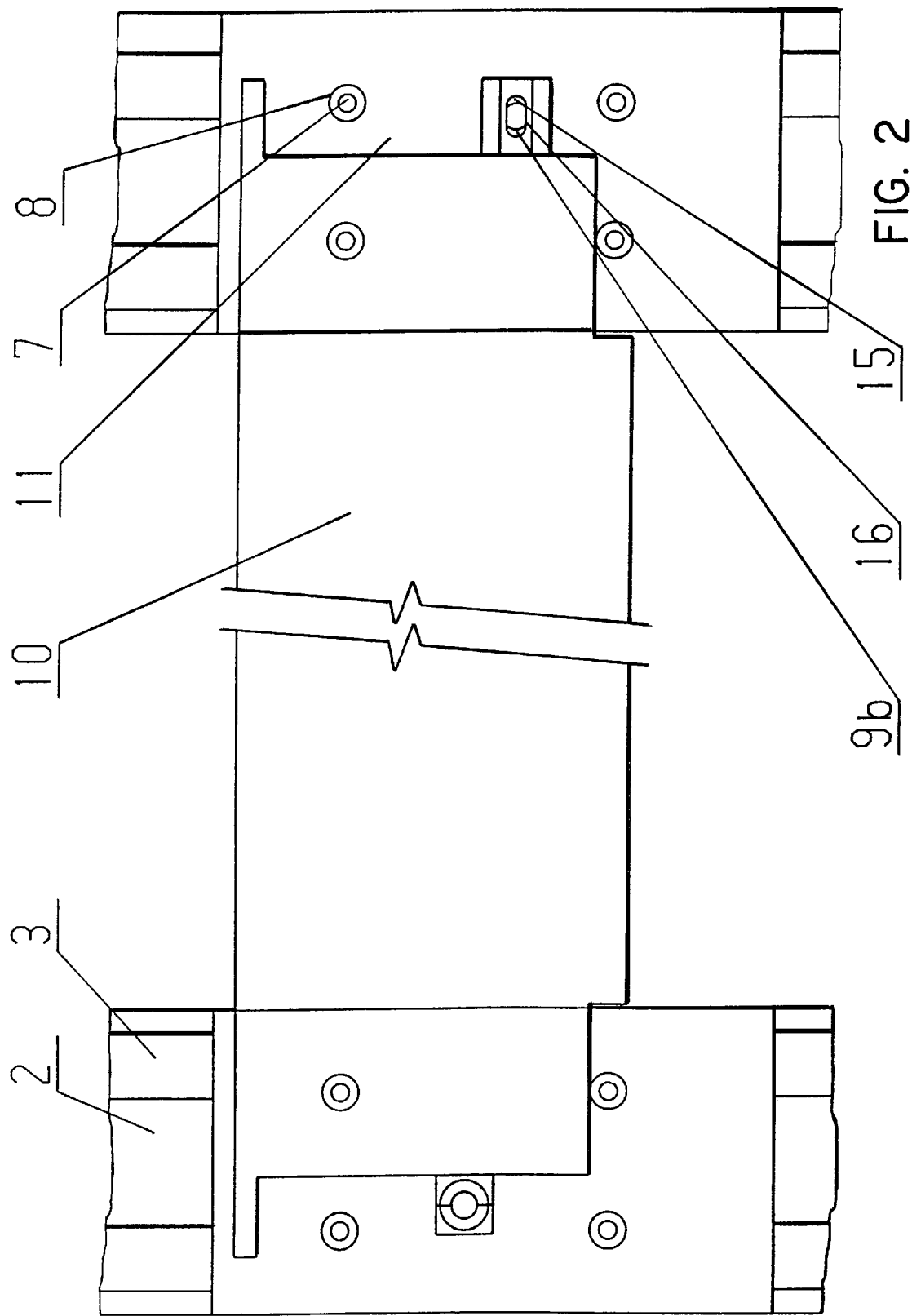
FIG. 2 is a fragmentary plan view of the assembly of FIG. 1.

A machine tool carriage 1 is supported on a machine bed 2. The machine bed 2 bears rail pairs 3 running parallel to one another, on each of which is mounted a linear motor 4 with guides 5. Each linear motor 4 supports a friction plate 6, in which adjusting screws 7 for springs 8 and pivotal bolts 9a and 9b are mounted. A machine carriage bridge 10 with bearing plates 11 lies on the friction plates 6 and is secured thereto by the bolts 16 and adjusting screws 7. An open area or space 12 is provided in the bearing plates 11 around each adjusting screw 7. The springs 8 are compressed between the screw head 13 of the adjusting screw 7 and the top of the bearing plate 11. The pivotable bolt 9a extends through the bearing plate 11 and is seated in a guide 14. The bolt 9b extends through a hole or slot 15 in the bearing plate 11 and extends in the longitudinal direction of the machine carrier bridge 10. The bolt 9b has side surfaces 16, which abut the longitudinal side walls defining the longitudinal hole or slot 15.

The machine carriage bridge 10 is pressed against the friction plates 6 by its weight and additionally by the adjusted spring force of the springs 8 acting on their bearing plates 11. As soon as forces caused by stresses in the machine carriage bridge 10 or by deviations of the rail pairs 3 from a parallel course overcome the force of friction between the friction plate 6 and the bearing plate 11, the bolt 9b slides and pivots in the longitudinal hole or slot 15. In the case of an accident or in the case of non-uniform starting or even in the case of starting of the linear motor 4 in the opposite direction, the machine carriage bridge can be obliquely turned about the bolts 9a and 9b. Here also the bolt 9b slides in the longitudinal hole or slot 15 compensating for the changed spacing between them. The movement of the machine carriage bridge 10 is possible by means of the open spaces 12 surrounding the adjusting screws 7. After eliminating the cause of the accident, the machine carriage bridge 10 is brought back into the operating position by controlling only one linear motor 4, and the linear motors, the bearings therefor, and the machine carriage bridge 10 will have suffered no damage.

Having thus described the invention, what is claimed is:

1. In a machine tool, the combination comprising:
  (a) a bed with horizontally spaced portions,
  (b) fixed parallel rails extending along said bed portions,
  (c) a machine tool carriage movable along said rails and including a bridge extending between said bed portions, (d) electrically driven linear motors at each end of said bridge for moving said carriage along said rails, (e) a mounting assembly mounting each end of said bridge on one of said linear motors, said mounting assembly including:
  (i) a friction plate between said bridge and the linear motor,
  (ii) biasing means biasing said bridge towards said linear motor, and
  (iii) guide bolts mounting said bridge on said motor, said bolts extending through and being pivotable in apertures in said bridge and said friction plate, said apertures at one end of said bridge being elongated in the longitudinal direction of said bridge to allow pivoting of said bridge relative to said linear motors about said bolts at the other end of said bridge.

2. The mounting assembly for a machine tool carriage in accordance with claim 1 wherein said bolts in said elongated apertures have side surfaces which abut the elongated sides of said aperture.

3. The mounting assembly for a machine tool carriage in accordance with claim 1 wherein said biasing means comprises compression spring means and the force is adjustable by adjusting screws adjustable independently of the pivotable bolts.

* * * * *